(No Model.)
2 Sheets—Sheet 1.
M. M. MONSANTO.
FLUID PRESSURE REGULATOR.
No. 351,276.　　　　　　　　Patented Oct. 19, 1886.
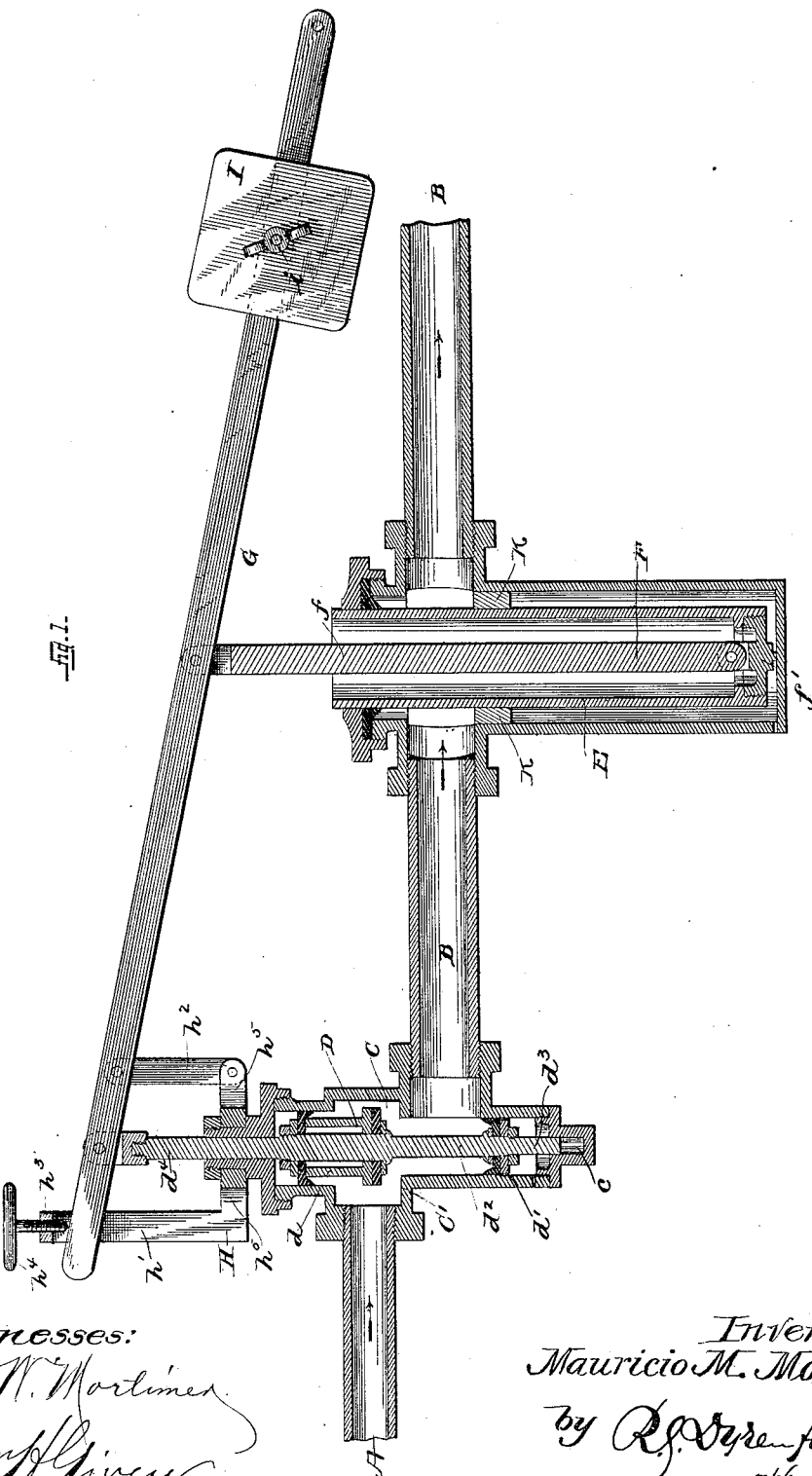
Witnesses:
Wm. W. Mortimer
Wm. H. Given
Inventor:
Mauricio M. Monsanto
by R. S. Dyrenforth,
his Attorney.

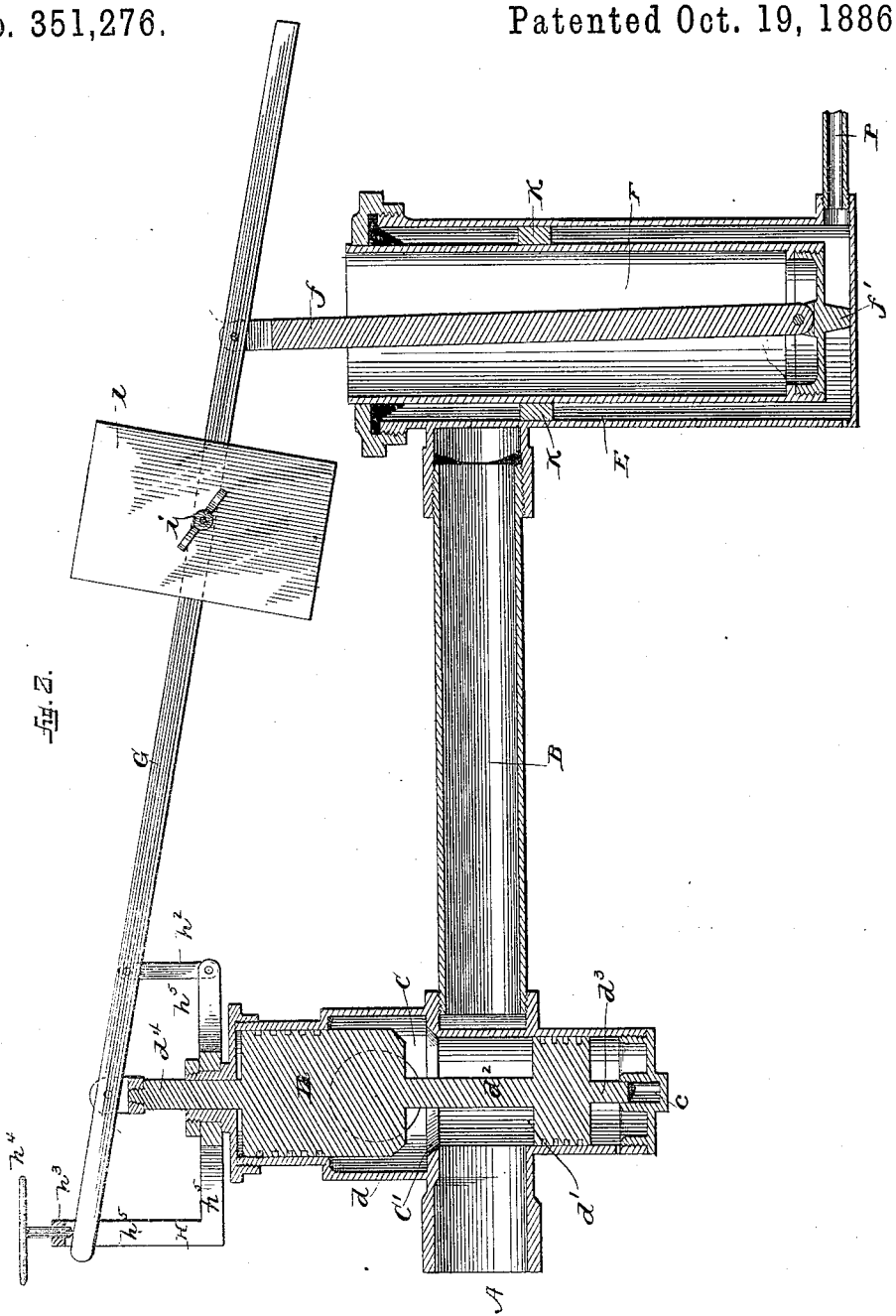

United States Patent Office.

MAURICIO M. MONSANTO, OF NEW YORK, N. Y., ASSIGNOR TO W. A. OGDEN HEGEMAN, OF SAME PLACE.

FLUID-PRESSURE REGULATOR.

SPECIFICATION forming part of Letters Patent No. 351,276, dated October 19, 1886.

Application filed January 23, 1886. Serial No. 189,447. (No model.)

*To all whom it may concern:*

Be it known that I, MAURICIO M. MONSANTO, a citizen of the United States of Colombia, South America, residing at New York, in the county of New York and State of New York, have invented certain new and useful Improvements in Fluid-Pressure Regulators; and I do hereby declare the following to be a full, clear, and exact description of the invention, such as will enable others skilled in the art to which it appertains to make and use the same.

This invention relates to fluid-pressure regulators of that class in which an escape-valve is operated through the medium of a rod connecting it with a piston or the like, so arranged as to be acted upon by the fluid.

The object of the invention is to produce a pressure-regulator which shall be simple and economic in construction and positive and reliable in operation, and between the working parts of which there will be little or no friction to retard the movements thereof; and whereby a uniform pressure may automatically and continuously be maintained in a main or supply pipe or conduit; and whereby, also, when any excess of pressure sufficient to cause a back-flow or otherwise is exerted in the main or supply pipe, the valve governing directly or indirectly the flow of the fluid through the said pipe will be closed, the object being automatically to graduate the flow beyond the apparatus of fluid under any pressure to a given uniform pressure of lower degree than the initial or unregulated pressure, both by throttling the said valve to reduce the pressure and by perfect closing to completely stop the flow.

With these objects in view my invention consists in a pressure-regulator incorporating a balanced valve having a projecting stem, a piston within a cylinder placed in the main-regulated supply or outlet pipe or conduit, or independently connected therewith, and in either case a suitable distance apart from the valve, and so arranged that the pressure of the fluid in such main pipe will be exerted upon the area of the piston, and a rod or lever connecting the piston of the cylinder and the valve, whereby any excess of pressure will operate the piston, and through the medium of the connecting-rod operate to close the valve governing the flow of the fluid through said pipe from the original source of supply, the rod being in the form of a lever carrying an adjustable weight acting with fulcrum and leverage, whereby the force exerted on the piston is transmitted to the valve-stem with the multiplied force of its leverage, tending to close the valve, while the weight with its leverage tends to keep the valve open.

Further, the invention consists in various novel combinations and details of construction hereinafter clearly set forth.

In the accompanying drawings, Figure 1 represents a central longitudinal vertical section of my improved pressure-regulating device, the parts being shown in such position as to allow the flow of fluid. Fig. 2 represents a similar view of a modified combination of connections, the valve being connected with the steam-conduit of a steam-pump, while the lever attachment or cylinder is independently connected with the water end of the pump or with the conduit for compressed air or other fluid by means of pipe P, whereby the steam-pressure or inlet area of steam-valve is regulated according to the amount of water, air, or other fluid pressure desired from the pump. I prefer that the cylinder be independent of the main conduit or water or other fluid pipe and connected therewith by a small pipe through which the water or other fluid pressure will be communicated hydraulically to the area of the piston; but, as will be readily seen, the cylinder may be a part of the water-pipe or main conduit, being set therein, as shown in Fig. 1.

In these drawings, A represents the inlet-pipe, B represents the outlet-pipe, and C represents a valve-chamber interposed between these pipes, (and a suitable distance from the cylinder E,) and with which valve-chamber each of them communicates. This valve-chamber is provided with two ports, one at the inlet and the other at the outlet pipe, so arranged that the lower wall of the upper chamber forms the upper wall of the lower chamber, and the opening or diaphragm in the same forms the seat for the valve D. Thus it will be seen that these walls referred to furnish what is practically a diaphragm, which, in connection with the body of the valve, affords means of allowing, reducing, or stopping the flow of fluid through the valve-chamber.

D represents the valve, which is composed of the upper portion, $d$, and the lower portion, $d'$, connected by a rod, $d^2$, having the projections $d^4$ at the top and $d^3$ at the bottom. The lower portion of the valve-chamber C is provided with a socket, $c$, in which the lower stem, $d^3$, slides, and by means of which the valve is retained in its proper place and guided in its movements up and down.

$C'$ represents a diaphragm or valve-seat, placed within the valve-chamber, through which the rod $d^2$ passes. The upper portion, $d$, of this valve rests upon the diaphragm-seat and closes the opening therein when it is desired to stop the flow of fluid through the valve-chamber into the outlet-pipe.

When the valve is open, as shown in the drawings, the fluid passes through the chamber between the heads $d$ and $d'$ of the valve, and inasmuch as the pressure of the fluid is exerted with equal force to raise one and depress the other, the position of the valve will not be affected by any degree of pressure under which the fluid enters the valve-chamber. When the valve is closed, the fluid exerts its pressure upon the cylindrical (or other form of) body of the upper valve-body, receiving pressure compensated and equalized in all directions, and is thereby balanced, so that in reopening the valve no resistance is encountered except the friction of the packing. Any excess of pressure accumulating through a leak in the valve acts through the piston in the cylinder of the lever attachment, and by means of the lever, with the multiplied force of its leverage, tending to seat the valve with great force.

In pressure-regulators of this kind, as heretofore generally constructed, the fluid comes in contact with only a portion of the piston by which the valve is operated, and, further, the valves usually employed are of such a character as to be affected by variations in pressure. The advantage of the present invention over these devices lies in the fact that the fluid comes in contact with all parts of the piston by which the valve is operated, and the valve itself, being self-balancing, is not affected by variations in pressure.

In Fig. 1, E represents a cylinder placed in the outlet-pipe B and so arranged that the fluid passing through the said pipe comes in contact with piston E, and acting upon its area moves it up and down. The cylinder is guided by three or more guides, K, as it is actuated by the pressure of the fluid or by means of the weight I on lever G. The piston-rod $f$ is pivotally or otherwise connected to the hollow piston F, preferably on the inside and preferably near the bottom thereof, and extends upward a suitable distance to a point where it is pivotally connected to an operating-lever, G.

$f'$ is a projection or button on the base of the piston F or on the base of the cylinder, or on both, which prevents the piston F from closing down on the base of the cylinder E, so as to by such closing prevent the action of the fluid on its area, and so as to admit always pressure at the base.

The lever G is connected in a suitable manner to the piston-rod and to the upper end of the valve-stem $d^4$, and is pivoted in the arm $h^2$ of the frame H, so that the motion up or down of the piston will be converted into an inverse movement of the valve.

H represents a frame which is mounted upon the outside of the valve-chamber. This frame consists of the base $h^5$ and the upwardly-projecting arms $h'$ and $h^2$. The arm $h'$ is provided near its upper end with an extension, $h^3$, in which is placed a set-screw, $h^4$. The arm $h^2$ is pivotally connected with the base of the frame H, and in the upper end of this arm is pivoted the operating-lever G, which is joined by suitable means with the upper end, $d^4$, of the valve-stem. The operating-lever extends beneath the extension $h^3$ and the extent of its upward movement is regulated by the set-screw $h^4$; or it may be regulated by a pin set in holes in said upright, or in any suitable manner. Set-screw $h^4$ also serves to make the valve a stop-valve by screwing down the end of the lever G, bringing thereby valve D upon its seat $C'$ and closing the opening or inlet.

From the foregoing it will be seen that an excess of pressure in the cylinder E will raise the piston F, elevate the end of the operating-lever G, which is connected to the piston-rod $f$, and simultaneously depress the end of said lever which is connected to the valve, thereby pressing the piston $d$ of the valve upon the diaphragm or valve-seat $C'$, or throttling the inlet area in accordance with the required flow or stoppage of the fluid, as may be desired.

In order to regulate the amount of pressure which shall be desired to be exerted before the valve D is throttled or closed, I provide the weight I, which slides upon the operating-lever G, and is provided with a set-screw, $i$, whereby it may be secured at any desired position thereon with respect to the point at which the lever is pivoted. The power of the adjustable weight I may be applied by means of pulley and weight suitably connected with the lever and adjusted as desired, instead of the adjustable weight being moved along or upon the lever itself. Thus it will be seen that the weight may be so adjusted upon the operating-lever as to render any desired degree of pressure necessary to operate the necessary throttling or closing of the valve.

Fig. 11 represents substantially the same pressure-regulating device, but so arranged that the flow of a fluid through the valve is regulated by the pressure of an independent fluid which is connected with the lever attachment or cylinder, the valve and the cylinder not communicating with each other by a continuous common conduit. This combination is exemplified, as stated above, in the case of a steam-pump or air-compressor, in which the steam passing through the valve is graduated or reduced according to the amount of water or air pressure or rate of flow desired.

It will, of course, be understood, that although I have particularly described the construction and arrangement of my improved pressure-reducing valve, various modifications thereof other than shown may be employed without departing from the spirit of my invention.

Having thus described my invention, what I claim as new, and desire to secure by Letters Patent, is—

1. A fluid-pressure regulator consisting of the combination, with a pipe or conduit, of the cylinder placed within the pipe or conduit in such manner that fluid flowing through the same will pass through the cylinder, the piston placed in the cylinder, the valve-chamber, the balanced valve, and the pivoted lever connecting the piston-rod and the valve, substantially as described.

2. A fluid-pressure regulator consisting of the combination, with a conduit, of the cylinder placed within the conduit in such manner that fluid flowing through the conduit will pass through the cylinder, the valve-chamber containing the balanced valve, and the pivoted lever provided with the adjustable weight and connecting the piston-rod and the valve, substantially as described.

3. A fluid-pressure regulator consisting of the combination, with a conduit, of the valve-chamber provided with the valve, and the frame H, consisting of the base portion, the arm $h'$, having the right-angular portion, carrying the set-screw, and the pivoted arm $h^2$, the cylinder, piston, and the lever G, pivoted in the arm $h^2$ and connecting the piston and the valve, substantially as described.

4. A fluid-pressure regulator consisting of the combination, with a conduit, of the valve-chamber provided with the balanced valve and the frame, consisting of the frame H, the arm $h'$, having the right-angular portion and the set-screw, and the pivoted arm $h^2$, the cylinder, the piston placed therein, and the lever provided with the adjustable weight and connecting the piston and the valve, substantially as described.

5. A fluid-pressure regulator consisting of the combination, with a conduit, of the valve-chamber provided with the balanced valve, the frame with set-screw, the pivoted arm, the piston in the cylinder connected by lever with the valve, the lever provided with adjustable weight and connecting the piston and the valve, whereby the pressure of one fluid, operating the piston within the cylinder, regulates the pressure to be exerted by another fluid passing through the valve, substantially as described.

In testimony whereof I affix my signature in presence of two witnesses.

MAURICIO M. MONSANTO.

Witnesses:
WILLM. SMITH,
E. H. LAGRANGE.